March 6, 1951  H. E. W. WEST  2,544,477
SPARK TYPE IGNITION SYSTEM FOR COMBUSTION ENGINES
Filed Dec. 28, 1949  2 Sheets-Sheet 1
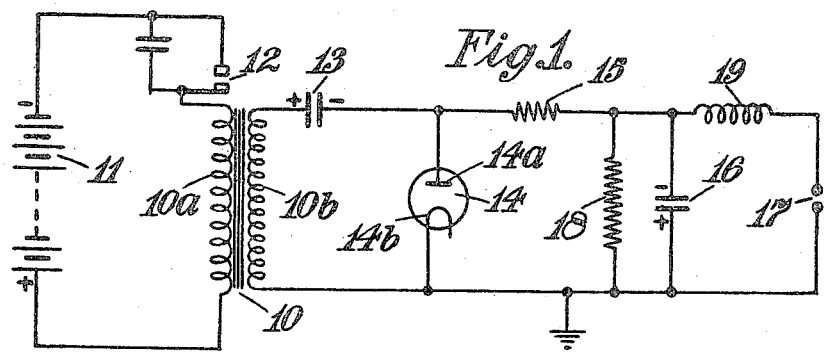
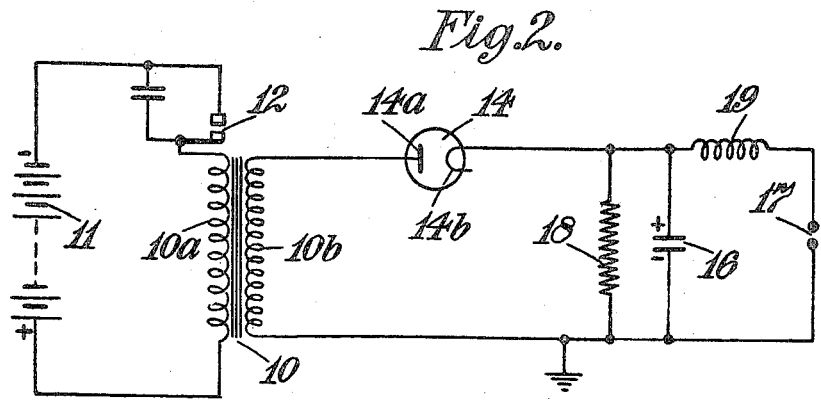
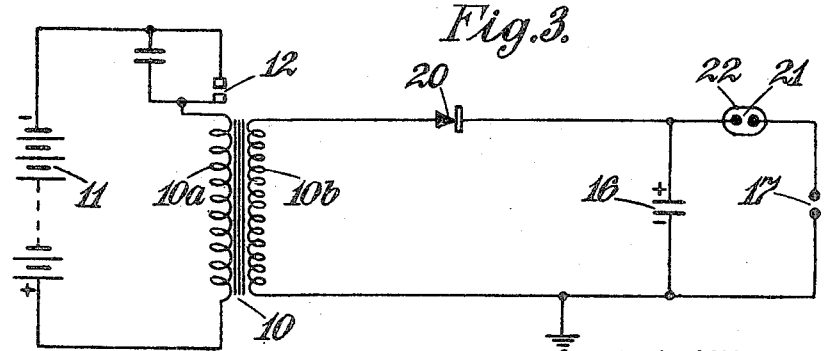
INVENTOR
H.E.W. WEST
BY
Wilkinson & Mawhinney
attorneys

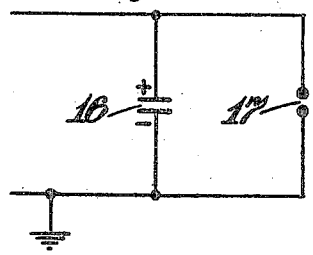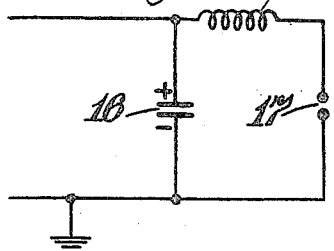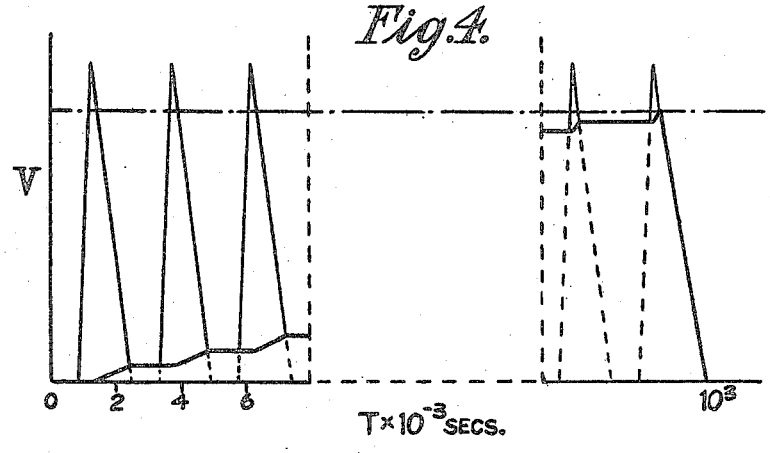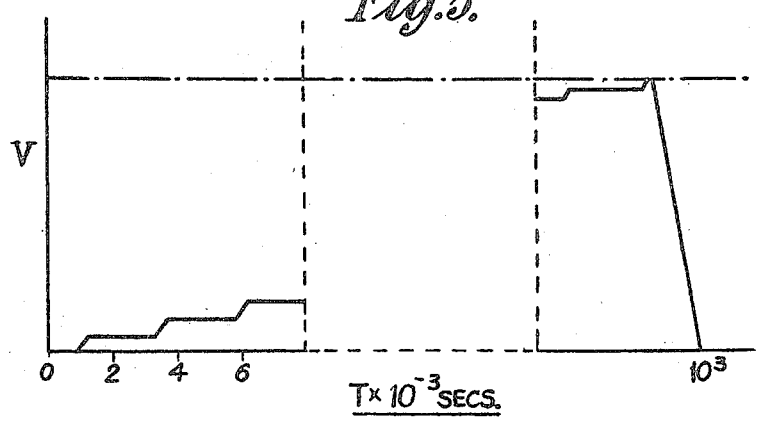

Patented Mar. 6, 1951

2,544,477

UNITED STATES PATENT OFFICE 2,544,477

SPARK TYPE IGNITION SYSTEM FOR COMBUSTION ENGINES

Harold Edward William West, Allestree, England, assignor to Rolls-Royce Limited, Derby, England, a British company Application December 28, 1949, Serial No. 135,443
In Great Britain January 4, 1949

9 Claims. (Cl. 315—242)

1

This invention relates to spark ignition systems of gas-turbine engines. Such systems are used for initiating combustion of fuel delivered to combustion equipment of the engine and hitherto have comprised a sparking plug fed, whilst the ignition system is operative, continuously from a high potential source such as a trembler coil. Since in such hitherto known arrangements the energy supply from the high potential source to the sparking plug is continuous, the energy available over a defined period of time is limited by the energy output from the source over that period of time. Such sparking plug has been arranged either to ignite fuel delivered by main fuel injectors in the combustion equipment or to ignite fuel delivered by an auxiliary fuel injector.

It has also been found that under certain operating conditions difficulties have been experienced with such ignition systems in supplying sufficient energy to the spark gap of the sparking plug to ensure ignition of the fuel charge. For instance, in aircraft powered by gas-turbine engines, it is often necessary to initiate combustion in the combustion equipment of the engine whilst the aircraft is in flight, and difficulties have been experienced in so doing with known ignition systems such as mentioned above, due to the fact that it has been impossible to supply an adequate amount of energy to produce a spark having sufficient heat to ignite the fuel supply under conditions of pressure and temperature experienced at high altitude.

Such difficulties might be overcome by use of a high potential source of considerably greater output than hitherto used but such a source would be uneconomical in terms of weight and size and input energy required.

According to the present invention there is provided for use in initiating combustion of fuel in a gas-turbine engine, a spark ignition system comprising a spark type ignition device having electrodes between which a spark passes; an electrical sparking circuit comprising the said electrodes and in series therewith an accumulator condenser of large capacitance capable of being charged to a potential at which break down of the sparking circuit occurs and a spark passes between said electrodes; a source of high potential electrical impulses; and electrical charging circuit means connecting said source with said condenser to charge the condenser by a plurality of successive high potential impulses step by step to the sparking potential and including a rectifier device to prevent discharge of the condenser through the charging circuit means.

With the spark ignition system of this invention the accumulator condenser is charged gradually to the sparking potential so that the energy available in the spark on discharge of the con-

2 denser is not limited to the energy output from the high potential impulse source in the sparking time but is substantially greater. Thus the heat generated by the spark is substantially greater than in known systems and ignition of the fuel is facilitated.

By a rectifier device is to be understood a device, such as a diode valve or metal rectifier, having asymmetrical current characteristics, that is, a device such that if a given voltage is applied to in one direction a current flow is obtained which is different from that obtained by applying the voltage in the opposite direction.

According to one preferred arrangement of this invention the accumulator condenser may be charged in a step-by-step manner, by a second condenser of smaller capacity arranged to be charged from the source of high potential impulses through a charging circuit having a low-time factor and comprising a rectifier device to prevent discharge of the second condenser through its charging circuit, said second condenser being arranged to discharge through a circuit having a higher time factor than the charging circuit thereby to charge the accumulator condenser. The rectifier device may comprise for example a diode valve or metal rectifier and the discharge circuit of the second condenser may comprise a high resistance. When the high potential impulse source for charging the second condenser is the secondary of the booster coil, the primary of which comprises a make-and-break contact, the capacitance of the second condenser should not be too large having regard to the remaining electrical characteristics of the circuit, otherwise the coil voltage will never rise to its maximum value. On the other hand the capacitance should not be too small or the time taken for the large condenser to be fully charged will become too long. Likewise if the resistance forming the discharge circuit for the second condenser is too large, it will increase the time taken to charge the large condenser, but on the other hand, if the resistance is too small, it will permit too free a discharge of the large condenser, thereby preventing it from becoming fully charged.

According to another preferred arrangement, the accumulator condenser is charged directly from the source of high potential impulses, such as the secondary of a booster coil, the primary of which comprises a make-and-break contact, and the charging circuit comprises a diode valve or a metal rectifier which acts to prevent flow of current through the charging circuit in one direction.

According to a feature of this invention, in order to avoid variation of the sparking potential under varying conditions of temperature and pressure, due for example to changes of altitude, the sparking circuit may also comprise a control spark gap having a higher sparking potential than the ignition device. The control spark gap may comprise electrodes in a sealed container.

A very high resistance may be connected across the large condenser as a safety measure.

The ignition system of this invention can be employed with advantage in gas-turbine engines having a torch igniter in which an auxiliary pilot jet of fuel is ignited by the spark ignition system to produce a flame for igniting the fuel supply from the main fuel burners or injectors, or in gas-turbine engines having the spark ignition system arranged so that the spark ignites the fuel supply from the main fuel burners or injectors.

Some arrangements of ignition system according to this invention will now be described by way of example, reference being made to the accompanying drawings in which:

Figure 1 illustrates diagrammatically one arrangement,

Figure 2 illustrates diagrammatically a second arrangement,

Figure 3 illustrates a third arrangement,

Figure 3A illustrates a modification of Figure 3,

Figure 3B illustrates a further modification of Figure 3,

Figure 4 is a graphical illustration of the manner in which the accumulator condenser is thought to be charged in the arrangement of Figure 1, and Figure 5 is a graphical illustration of the manner in which the accumulator condenser is thought to be charged in the arrangements of Figures 2 to 3B.

Referring to Figure 1, there is illustrated one arrangement suitable for operation from say a 24 volt battery of an aircraft. The ignition system comprises a booster coil 10, the primary winding 10a of which is connected across a battery 11 in series with a pair of contacts 12, one of which is carried on an armature actuated by the magnetic field produced by the booster coil. When the magnetic field reaches a given strength, the movable contact carried by the armature is caused to break the circuit through the primary, thereby to cause collapse of the magnetic field and re-making of the circuit through the primary. The booster coil secondary winding 10b is closely coupled with the primary winding and has a large number of turns compared with the primary, so that high voltage unidirectional impulses are produced in it on breaking of the primary circuit.

The secondary of the booster coil, which may conveniently have an inductance of 9-25 henries, is arranged to charge a small capacity condenser 13, for example a condenser having a capacitance of 500 pf., through a diode valve 14 which allows current to flow through the circuit comprising the condenser 13, the secondary winding 10b and the valve 14 in one direction only. This circuit is arranged to have a low-time factor so that the condenser 13 can be fully charged rapidly. Conveniently the diode valve 14 and the condenser 13 are connected in series across the ends of the booster coil secondary winding 10b with the anode 14a of the diode connected to one plate of the condenser and the other plate of the condenser connected to the positive terminal of the booster coil secondary.

The condenser 13 is arranged so that it can discharge through a blocking resistance 15, which conveniently has an electrical resistance of 1 megohm, to charge a large capacity accumulator condenser 16, for example a condenser having a capacity of about 0.24 μf. or higher depending on the energy required per discharge. One end of the resistance 15 is connected between the anode 14a of the diode valve 14 and the small capacitance condenser 13 and the other end of the resistance 15 is connected to one plate of the accumulator condenser 16, the other plate of which will be connected to the filament 14b of the diode valve 14. The accumulator condenser 16 also forms part of a sparking circuit comprising in series condenser 16, and the electrodes of the spark plug 17 and if desired also comprising a choke 19 as shown to increase the discharge time of condenser 16. A resistor 18 of very high electrical resistance, say 200 megohms, may be connected across the large capacitance condenser 16 for safety purposes.

At the instant when the output from the booster coil 10 becomes zero, the small capacitance condenser 13 will discharge through the resistance 15 to charge the accumulator condenser 16, it being impossible for the condenser 13 to discharge through its charging circuit. The discharge circuit of the condenser 13 is arranged to have a time factor which is high compared with that of the charging circuit and so the accumulator condenser 16 gradually becomes charged step by step due to successive discharges of the small capacitance condenser 13 and ultimately the accumulator condenser 16 will become charged to a potential at which the sparking circuit breaks down to cause the passage of a high energy spark between the points of the spark gap 17.

The charging operation of the condenser 16 is diagrammatically illustrated in Figure 4, in which the peaked traces 30 indicate successive chargings and dischargings of the condenser 13 and the stepped trace 31 indicates the charging and discharge of the condenser. In the arrangement illustrated, the condenser 13 is charged and discharged approximately once every 2.5 milliseconds, having a charging time of about 0.4 millisecond and a discharge time of about 1.2 milliseconds, and the condenser 16 is charged to the sparking potential in about 1 second so that about 400 high potential impulses are required to charge the condenser 16 to the sparking potential.

It is preferred to arrange that the energy available in the spark should be several joules. For example, if the ignition system is a 10 kv. system and the accumulator condenser has a capacitance as above mentioned the available energy will be 12 joules. The same available energy will be obtained using a 2 kv. system and a condenser 16 having a capacitance of 6 μf.

In the alternative arrangement illustrated in Figure 2, the small capacitance condenser 13 and its discharge circuit (comprising the resistance 15) are omitted and the accumulator condenser 16 is arranged to be charged directly from the booster coil secondary winding 10b. In this case, the anode 14a of the diode valve 14 is connected to one end of the booster coil secondary winding 10b and its filament 14b is connected to one plate of the condenser 16, while the other plate of the condenser 16 is connected to the opposite end of the booster coil secondary winding 14b. The safety resistor 18 and the choke 19 may be provided as in the previous construction and the spark gap 17 is connected across the condenser 16 so that the sparking circuit comprises condenser 16 and electrodes 17 in series together with choke 19 if provided. In this arrangement, the condenser 16 is gradually charged to the required voltage by successive impulses as illustrated in Figure 5 in which trace 32 indicates the voltage across condenser 16 and when the condenser is fully charged discharge across the spark gap 17 occurs as in a previous construction. In this arrangement also the condenser 16 is charged once in about one second and about 400 impulses are required to charge it to the sparking potential.

In the arrangement illustrated in Figure 3, which is similar to that shown in Figure 2, the ignition system comprises as before a booster coil 10, the primary winding 10a of which is in series with make-and-break contacts 12 across battery 10 so as to produce in the primary winding 10a a pulsating unidirectional current. The secondary winding 10b has one end connected to one terminal of the accumulator condenser 16 and has its opposite end connected to one terminal of a metal rectifier 20, the other terminal of which is connected to the opposite terminal of the condenser 16. The secondary winding 10b and metal rectifier 20 constitute the charging circuit for the condenser 16. The sparking circuit of the system comprises in series the spark gap 17 the condenser 16 and a control spark gap 21 disposed in a sealed container 22, so that the potential at which the spark passes between the points of the auxiliary spark gap 21 is substantially unaffected by the ambient atmospheric conditions. The sparking potential of spark gap 21 is selected to be higher than that of spark gap 17 of the sparking plug.

Alternatively as shown in Figure 3A, the spark gap 17 may be directly connected across condenser 16 so that the sparking circuit comprises solely the spark gap 17 and condenser 16.

As another alternative, Figure 3B, a choke 19 to increase the discharge time of the condenser 16 may be connected in the sparking circuit in series with the spark gap 17 and condenser 16.

In operation of the arrangement of Figure 3, the condenser 16 is gradually charged through the metal rectifier 20 which prevents discharge of the condenser back through the secondary winding 10b. When the potential across the condenser 16 reaches a value sufficient to cause break down of the sparking circuit and a spark to pass between the electrodes of the auxiliary spark gap 21 in the sealed container 22, a high energy spark will also pass between the electrodes of the main sparking device 17. In the arrangements of Figures 3A and 3B, the condenser 16 will be charged to the sparking potential of spark gap 17. The graph of Figure 5 is representative of the manner in which the systems of Figures 3, 3A and 3B operate.

In the constructions described a high energy spark is obtained which contains sufficient heat to ignite fuel even under conditions of pressure and temperature such as are experienced at high altitudes. The ignition systems are therefore especially suitable for use with gas-turbine engines, either to create a spark across the spark gap of a sparking plug associated in a torch igniter with an auxiliary fuel jet thereby to produce a flame to ignite fuel being supplied to the engine through its main injection devices, or to create a spark across the spark gap of a sparking plug arranged to ignite directly the fuel being supplied to the engine through its main injection devices.

I claim:
1. For use in initiating combustion of fuel in a gas-turbine engine, a spark ignition system comprising a spark type ignition device having electrodes between which a spark passes; an electrical sparking circuit consisting only of the said electrodes and in series therewith an accumulator condenser of large capacitance; a source of high potential electrical impulses; and electrical charging circuit means connecting said source with said condenser to charge the condenser by a plurality of successive high potential impulses step by step to the breakdown potential of the electrodes to produce successive sparks across said electrodes at untimed intervals and further including a rectifier device to prevent discharge of the condenser through the charging circuit means.

2. For use in initiating combustion of fuel in a gas-turbine engine, a spark ignition system comprising a low capacitance condenser, a charging circuit including said low capacitance condenser, rectifier means in said low capacitance condenser charging circuit, an alternating current supply to said low capacitance condenser charging circuit, a high capacitance condenser, a high capacitance condenser charging circuit including both said condensers, a spark gap and a sparking circuit including said spark gap and said high capacitance condenser.

3. A spark ignition system as claimed in claim 2 further comprising a resistance in series with both said condensers but included only in said high capacitance condenser charging circuit.

4. A spark ignition system as claimed in claim 3 in which the rectifier means is a diode valve, one end of said resistance being connected between the anode of the diode valve and the small capacitance condenser, the other end of said resistance being connected to one plate of the high capacitance condenser, the other plate of said high capacitance condenser being connected to the filament of said diode valve.

5. For use in initiating combustion of fuel in a gas-turbine engine, a spark ignition system comprising a spark type ignition device having electrodes between which a spark passes; an electrical sparking circuit consisting only of the said electrodes and in series therewith a control spark gap having a sparking potential which is higher than the sparking potential of said electrodes and an accumulator condenser of large capacitance; a source of high potential electrical impulses; and electrical charging circuit means connecting said source with said condenser to charge the condenser by a plurality of successive high potential impulses step by step to the breakdown potential of the sparking circuit to produce successive sparks across said electrodes in untimed intervals and further including a rectifier device to prevent discharge of the condenser through the charging circuit means.

6. For use in initiating combustion of fuel in a gas-turbine engine, a spark ignition system comprising a spark type ignition device having electrodes between which a spark passes; an electrical sparking circuit consisting only of the said electrodes and in series therewith an inductive choke and an accumulator condenser of large capacitance; a source of high potential electrical impulses; and electrical charging circuit means connecting said source with said condenser to charge the condenser by a plurality of successive high potential impulses step by step to the breakdown potential of the sparking circuit to produce successive sparks across said electrodes in untimed intervals and further including a rectifier device to prevent discharge of the condenser through the charging circuit means.

7. For use in initiating combustion of fuel in a gas-turbine engine, a spark ignition system comprising a source of direct current supply, an induction coil, an interrupter, a primary circuit including said current supply, interrupter and the primary of said induction coil, a secondary circuit including the secondary of said induction coil, a low capacitance condenser in said secondary circuit, rectifier means in said secondary circuit, a high capacitance condenser, a tertiary circuit including both said condensers for charging the high capacitance condenser from the low capacitance condenser by a plurality of successive high potential impulses step by step, a spark gap, and a fourth sparking circuit including said spark gap and said high capacitance condenser.

8. For use in initiating combustion of fuel in a gas-turbine engine, a spark ignition system comprising a spark type ignition device having electrodes between which a spark passes, a sparking circuit including said electrodes, a condenser in said sparking circuit, a charging circuit connected to said sparking circuit for charging said condenser, an alternating voltage supply in said charging circuit for progressively charging said condenser through a series of high potential impulses, and rectifier means in said charging circuit to prevent said condenser from discharging back through said charging circuit.

9. For use in initiating combustion of fuel in a gas-turbine engine, a spark ignition system comprising a spark type ignition device having electrodes between which a spark passes, a sparking circuit, a condenser in said sparking circuit, said sparking circuit connecting said condenser to said electrodes, a charging circuit connected to said sparking circuit for charging said condenser, a transformer in said charging circuit having a primary winding and a secondary winding, the secondary of said transformer being connected to said condenser, a battery connected to the primary of said transformer for supplying energy to said transformer, an interrupter in series with said battery and said transformer for energizing and deenergizing the primary, said interrupter being operated by the magnetic field of said transformer, and rectifier means between said transformer and said condenser to prevent said condenser from discharging back through said charging circuit.

HAROLD EDWARD WILLIAM WEST.

REFERENCES CITED

The following references are of record in the file of this patent:

UNITED STATES PATENTS

| Number | Name | Date |
| --- | --- | --- |
| 2,030,228 | Randolph et al. | Feb. 11, 1936 |
| 2,326,696 | Stoddard | Aug. 10, 1943 |
| 2,391,611 | Back | Dec. 25, 1945 |